(12) United States Patent
Peteanu et al.

(10) Patent No.: US 7,478,361 B2
(45) Date of Patent: Jan. 13, 2009

(54) METHOD AND SYSTEM FOR MANAGING APPLICATION DEPLOYMENT

(75) Inventors: Razvan C. Peteanu, North York (CA); Andrei Oprea, Toronto (CA); Andrew Niel Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 10/870,228

(22) Filed: Jun. 17, 2004

(65) Prior Publication Data
US 2005/0283759 A1 Dec. 22, 2005

(51) Int. Cl.
*G06F 9/44* (2006.01)
(52) U.S. Cl. ............... 717/102; 717/100; 717/104; 717/168; 709/226
(58) Field of Classification Search ......... 717/100–106, 717/168–178; 709/226
See application file for complete search history.

(56) References Cited

U.S. PATENT DOCUMENTS

| | | | | |
|---|---|---|---|---|
| 5,414,812 A | * | 5/1995 | Filip et al. ............ | 707/103 R |
| 5,889,956 A | * | 3/1999 | Hauser et al. .......... | 709/226 |
| 6,163,544 A | * | 12/2000 | Andersson et al. ...... | 370/422 |
| 6,272,544 B1 | * | 8/2001 | Mullen ................ | 709/226 |
| 6,289,488 B1 | * | 9/2001 | Dave et al. ........... | 716/1 |
| 6,336,138 B1 | * | 1/2002 | Caswell et al. ........ | 709/223 |
| 6,628,304 B2 | * | 9/2003 | Mitchell et al. ....... | 715/734 |
| 6,986,135 B2 | * | 1/2006 | Leathers et al. ....... | 717/177 |
| 2003/0051236 A1 | * | 3/2003 | Pace et al. ........... | 717/177 |
| 2003/0084156 A1 | * | 5/2003 | Graupner et al. ....... | 709/226 |
| 2004/0017783 A1 | * | 1/2004 | Szentesi et al. ....... | 370/256 |
| 2004/0073673 A1 | * | 4/2004 | Santos et al. ......... | 709/226 |

FOREIGN PATENT DOCUMENTS

WO  WO 3062982 A1 * 7/2003

* cited by examiner

*Primary Examiner*—Wei Y Zhen
*Assistant Examiner*—Matthew J Brophy
(74) *Attorney, Agent, or Firm*—Duke W. Yee; Jeffrey S. LaBaw; Wayne P. Bailey

(57) ABSTRACT

Deployment of an application is managed using available resources from a resource system. A resource dependency characterization of the application is established to enable deployment of the application. A logical characterization and a network characterization of a desired deployment are also established. A deployment plan containing an outline for resources and configurations used for deployment is developed based on the resource dependency characterization, the logical characterization and the network characterization. The deployment plan is processed for correlation with the available resources. The processed deployment plan is then implemented.

14 Claims, 5 Drawing Sheets

METHOD AND SYSTEM FOR MANAGING APPLICATION DEPLOYMENT

FIELD OF THE INVENTION

The present invention relates to the field of application deployment management.

BACKGROUND

Deployment of applications in environments, such as a data centre or a testing environment, involves a complex setup process which is often done manually for each separate deployment. The deployment setup can involve a combination of both common components that are specific to the application but are not dependent on the environment and components that are specific to the environment. When an application is deployed in different environments using the manual process, the deployment setup is manually recreated for each new environment even if there are components that are common for every deployment of the application. This redundancy in the specification of the common components for the application is cumbersome and can introduce errors and inconsistencies between different but similar deployments.

Further, since the deployment setup is a manual process, the requirements of the application are conceptualized by a user employing actual resources available in the data center. Preservation of such a logical view of the deployment would enable flexibility in the assignment of resources for the deployment of the application.

SUMMARY OF THE INVENTION

In accordance with one aspect of the present invention there is provided a method of managing deployment of an application using available resources from a resource system, the method comprising: establishing a resource dependency characterization of the application to enable deployment; establishing a logical characterization of a desired deployment; establishing a network characterization for the desired deployment; developing a deployment plan containing an outline of resources and configurations used for deployment based on the resource dependency characterization, the logical characterization and the network characterization; processing the deployment plan for correlation with the available resources; and implementing the processed deployment plan.

In accordance with another aspect of the present invention there is provided a system for managing deployment of an application using available resources from a resource system, the system comprising: an application structure mechanism for establishing a logical application structure containing resource dependency characterization of the application to enable deployment; a logical deployment template for establishing a logical deployment template containing logical characterization of a desired deployment; a network topology template for establishing a network topology template containing network characterization for the desired deployment; a deployment mechanism for developing a deployment plan containing an outline of resources and configurations used for deployment based on the resource dependency characterization, the logical characterization and the network characterization; a request processing mechanism for processing the deployment plan for correlation with the available resources; and an implementation mechanism for implementing the processed deployment plan.

In accordance with a further aspect of the present invention there is provided a computer readable medium having stored thereon computer-executable instructions for managing deployment of an application using available resources from a resource system, the computer-executable instructions comprising: establishing a resource dependency characterization of the application enable deployment; establishing a logical characterization of a desired deployment; establishing a network characterization for the desired deployment; developing a deployment plan containing an outline of resources and configurations used for deployment based on the resource dependency characterization, the logical characterization and the network characterization; processing the deployment plan for correlation with the available resources; and implementing the processed deployment plan.

Deployment of an application is managed using available resources from a resource system. A resource dependency characterization of the application is established to enable deployment of the application. A logical characterization and a network characterization of a desired deployment are also established. A deployment plan containing an outline for resources and configurations used for deployment is developed based on the resource dependency characterization, the logical characterization and the network characterization. The deployment plan is processed for correlation with the available resources. The processed deployment plan is then implemented.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be described in conjunction with the drawings in which.

DETAILED DESCRIPTION

Figure 1:
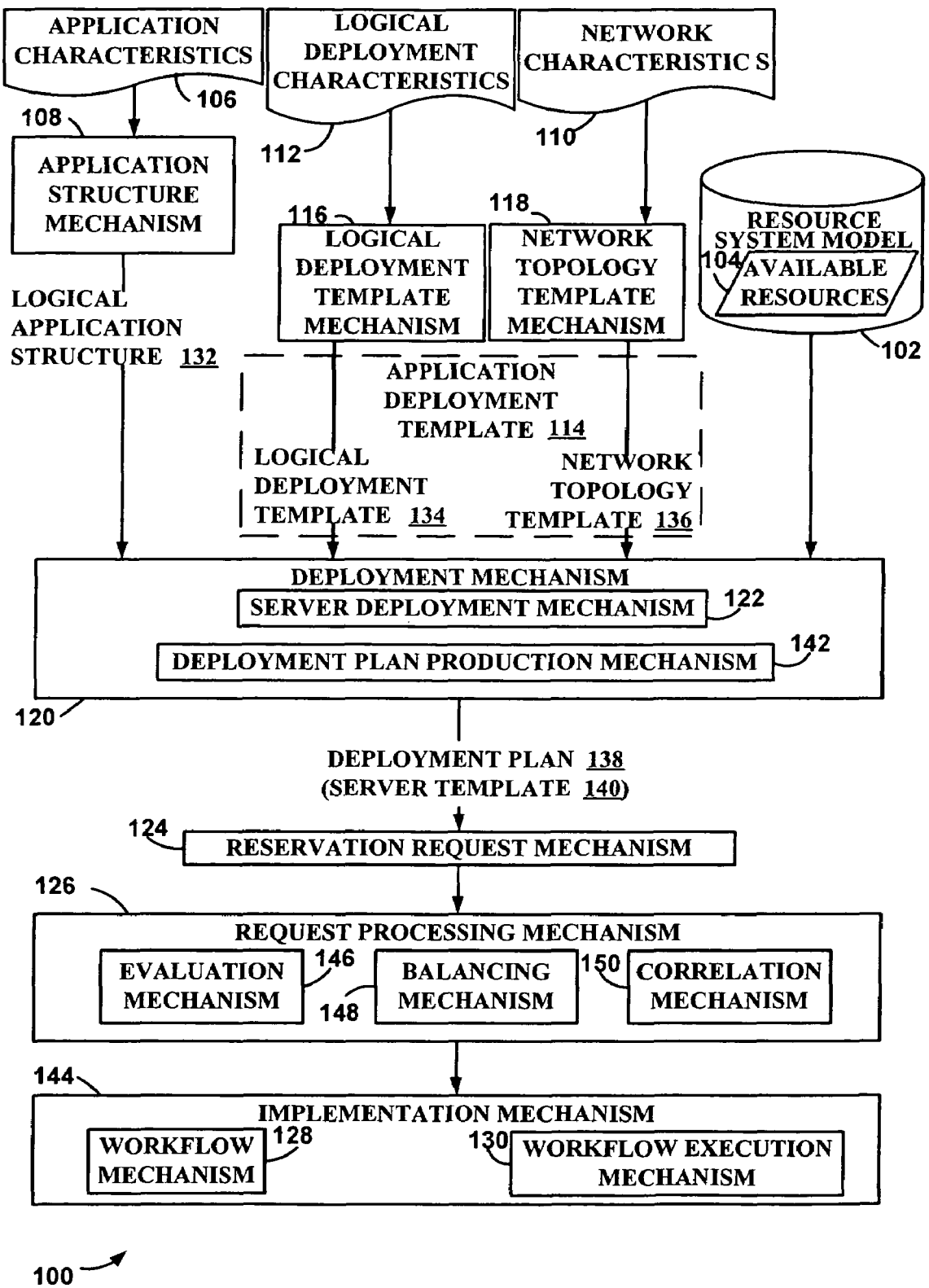
FIG. 1 illustrates a system for managing application deployment.

FIG. 1 illustrates a system 100 for managing the deployment of an application using resources in a resource system (not shown), such as a data center. The system 100 balances the availability of resources in the resource system and characteristics describing the desired configuration of these resources with resource requests from the application for execution thereof.

The resources in the resource system are represented in a resource system model 102 containing data on available resources 104. The available resources 104 may be any resource used for the execution of an application, including servers, routers, software licenses, etc., which has available capacity. The data on the available resources 104 includes information on the characteristics and configurability of each resource in the resource system model 102 that is germane to the resource system. Such information can include total resource capacity, available capacity, speed, communication protocols, etc. The resource system model 102 also represents the relationships between the available resources 104 where applicable, such as connections between servers, etc.

The application is considered to be composed of multiple elements which are distinct deployable units. The application is broken down such that each element contains a small amount of application functionality but still retains its distinct deployability. Each element has a known type that is used for processing the deployment of the application. The resource system model 102 contains software stacks that depict the relationship of each of the actual elements from the application with other software.

Application characteristics 106 are obtained by an application structure mechanism 108 in the system 100. These application characteristics 106 represent resources and their configurations that may be used for deployment of the application. The application structure mechanism 108 receives the application characteristics 106 and produces a logical application structure 132 therefrom for use by other mechanisms in the system 100. The logical application structure 132 contains a characterization of resource dependencies for each element. The application may successfully be deployed when these resource dependencies are satisfied. The production of the logical application structure 132 will be discussed later in conjunction with FIG. 3. Logical deployment characteristics 112 and networking characteristics 110 are received by a logical deployment template mechanism 116 and a network topology template mechanism 118, respectively. The logical deployment characteristics 112 are specified by a user to provide a logical view of the desired characteristics of the configuration of a desired deployment. The networking characteristics 110 are specified by a user to depict communication connections between resources. The network characteristics 110 and the logical deployment characteristics 112 are used by the mechanisms 116 and 118 to form an application deployment template 114 that sets out the desired characteristics of a deployment (not specific to the current application being deployed) in a manner that can be used in determining deployment of resources.

The logical deployment template mechanism 116 receives the logical deployment characteristics 112 and produces a logical deployment template 134. The logical deployment template 134 describes from a logical view how different types of elements that could compose the application are to be deployed according to various types of resources. The logical deployment template 134 contains a logical characterization of a desired deployment. The production of the logical deployment template 134 will be discussed later in conjunction with FIG. 4. The network topology template mechanism 118 receives the network characteristics 110 and forms a network topology template 136. The network topology template 134 describes the network connections for different types of elements that could be in the application. The network topology template 136 contains a network characterization of the desired deployment. The production of the network topology template 136 will be discussed later in conjunction with FIG. 5. The logical deployment template 134 and the network topology template 136 together form the application deployment template 114.

Alternatively, the logical deployment template 134 and the network topology template 136 can be automatically produced by the logical deployment template mechanism 116 and the network topology template mechanism 118, respectively. Production of the two templates 134 and 136 may involve selecting appropriate templates from among templates in a data store. Selection of the templates 134 and 136 may be based on the type of elements in the logical application structure 132, various requirements for the elements, etc. For example, the templates 134 and 136 selected may be those templates that specify desired configuration characteristics for every type of element in the logical application structure 132.

A deployment mechanism 120 receives the logical deployment template 134, the network topology template 136 and the logical application structure 132 to develop a deployment plan 138 which contains the target software and hardware configurations to be implemented for the deployment of the application. The deployment plan 138 presents a logical view of the deployment configuration showing functional components which may actually consist of multiple hardware and/or software resources having a particular configuration and performing a specific function. The networking configuration and the hardware to support this configuration for the deployment are outlined in the deployment plan 138 along with the dependencies between elements that are depicted in the logical application structure 132.

The deployment mechanism 120 contains a deployment plan production mechanism 142 that compares the requirements outlined in the logical application structure 132 with the desired configurations presented in the logical deployment template 134 and the network topology template 136. From these inputs, the deployment plan production mechanism 142 creates a list of the resources and characteristics of the resources and the dependencies and connections between the resources that form the deployment plan 138 that is to be used for deployment.

The deployment plan 138 does not contain a complete mapping of the requirements in the logical application structure 132 to the available resources 104 in the resource system model 102. The deployment plan 138 may reference specific resources that might be assigned once for the entire time that the application is deployed. The specified resources may be shared resources such as, for example, routers or switches. The deployment plan 138 may also contain an overview of some or all of the resources that will be used for deployment from a logical perspective. Resources that may be assigned and re-assigned during the entire time that the application deployed may be presented in the deployment plan 138 by their characteristics and configurations for the resources to be used for deployment. The generally indicated resources may include on-demand resources such as servers, IP addresses, etc. The generally indicated resources are assigned to actual available resources 104 prior to execution of the deployment. By the deployment plan 138 providing a logical view of the deployment, a deployment solution that is somewhat separate from the actual resources in the execution environment is provided. The deployment plan 138 may be used for subsequent deployments or reassignments of resources without being developed repeatedly for each change.

Thus, the deployment plan 138 acts as a high level deployment solution for the application. An exemplary deployment mechanism 120 is described in detail in commonly owned co-pending application titled Method and System for Establishing a Deployment Plan for an Application," filed concurrently herewith and incorporated herein by reference.

Within the deployment plan 138, servers may be treated as separate resources or multiple servers may be grouped together to form a cluster. Each server in the cluster (or each of some other resource in a cluster) can have the same configuration. The deployment mechanism 120 contains a server deployment mechanism 122 that produces a server template 140 containing configurations for server clusters for the deployment. An exemplary server deployment mechanism 122 is described in detail in commonly owned co-pending application titled "Method and System for Establishing a Server Template for an Application," filed concurrently herewith and incorporated herein by reference.

The deployment plan 138 with the server template 140 are provided to a reservation mechanism 124 which forms a request for the resources identified in the deployment plan 138. This request is provided to request processing mechanism 126 of the system 100 where the resources request is reviewed.

The request processing mechanism 126 includes an evaluation mechanism 146, a balancing mechanism 148 and a correlation mechanism 150 that all function together to coordinate all requests for resources in the resource system with available resources 104. The evaluation mechanism 146 examines the deployment plan 138 to assess whether a level of service for the application or user of the application would be met, exceeded or fall short based on minimum resource requirements identified in the deployment plan 138. If the level of service exceeds or falls short based on the request, then the request may be reconsidered at a later time. The request processing mechanism 126 may periodically evaluate the availability of resources 104 and the requests of the applications.

After the service level has been confirmed to meet the agreed level of service, the balancing mechanism 148 considers the available resources 104 are considered in conjunction with the current reservation request and any other requests for resources in the resource system to confirm that there are sufficient available resources to satisfy the current request. Once it is known that the reservation request can be met then the correlation mechanism 150 examines how the deployment plan 138 can be mapped to actual resources. This mapping may involve combining multiple resource requests to a single resource if sufficient capacity exists on the resource. This mapping may also include reserving resources that are not explicitly but are implicitly indicated in the deployment plan 138 (e.g. reserving capacity on a node between nodes A and B where the deployment plan 138 only specifies capacity on nodes A and B and the communication link between A and B). While the deployment plan 138 may provide, at least in part, a logical conceptual view of the deployment solution, the request processing mechanism 126 translates that conceptual view into a more physical actual depiction of the deployment including specifying individual resources that are to be assigned in the deployment.

If resources are to be used in the deployment then the request processing mechanism 126 may change the available resources 104 to reflect this assignment.

The resources that are to be deployed and the configuration that these resources are to be given is communicated to an implementation mechanism 144 so that a workflow to deploy these resources can be developed. The implementation mechanism 144 contains a workflow mechanism 128 and a workflow execution mechanism 130. Each workflow that is developed may employ the same structure. The structure of the workflow may be pre-determined to take into account the architecture of the resource system as well as other implementation constraints. The workflow structure takes into account lags in processing time for each workflow segment as well as dependencies that workflow segments have on each other. The structure of the workflow may be such that an outline of deployment of every possible type of resource in the resource system model 102 is provided. If a specific deployment does not involve every possible type of resource then those sections in the workflow structure pertaining to resources not involved in the specific deployment will be skipped during execution of the workflow.

The workflow structure is expanded by the workflow mechanism 128 to include information contained in the deployment plan 138. The workflow structure provides a framework for the deployment of an application but does not necessarily contain detailed deployment instructions for each type of resource. The outline for each type of resource may point to other more specific workflows that contain detailed deployment instructions where the specific workflow used may depend on characteristics of the deployment obtained from the deployment plan 138. For example, the outline may provide instructions that identifies every resource of a particular type in the deployment plan 138 and obtains the characteristics for each instance of this resource type in the deployment plan. The outline may then point to various workflows that provide different configurations for the specific type of resource based on the obtained characteristics. Both the outline and the specific workflows are provided with information providing details on the configuration and identifying specific resources indicated in the deployment plan 138. Alternatively, the outline may point to a single workflow that accepts the characteristics as arguments to enable deployment of the different configurations.

A library of specific workflows for implementing detailed portions of the deployment may be established. Each of these specific workflows pertains to the deployment of a specific type or resource and may be further limited to specific configuration(s) for the resource. For example, there may be a workflow segment in the data store to deploy a server having a specific configuration and there may be another workflow segment to provide a specific workspace on a server, etc.

The workflow to deploy the application is provided to a workflow execution mechanism 130 for implementation.

Figure 2:
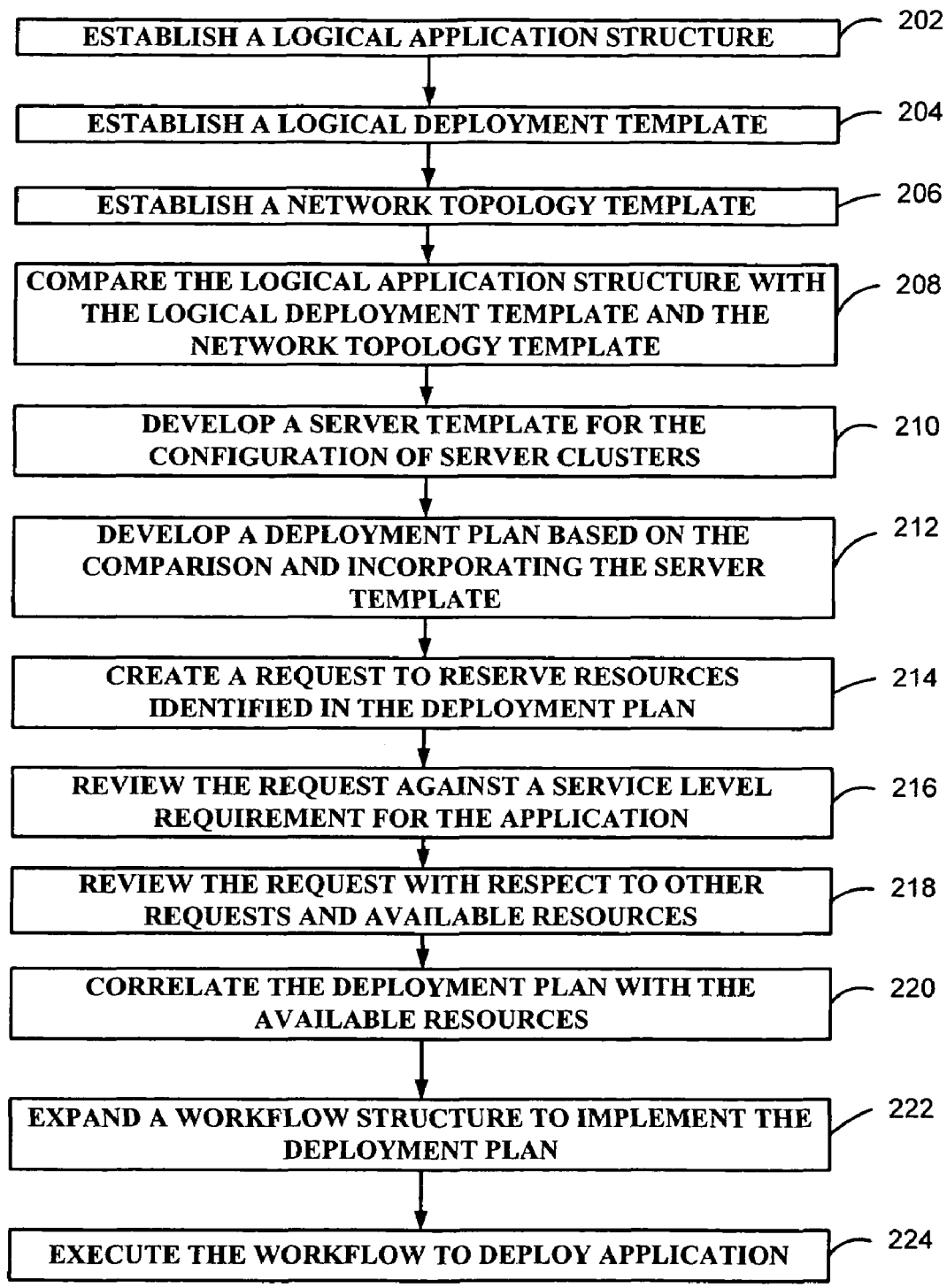
FIG. 2 illustrates a method of managing application deployment.

FIG. 2 shows a method 200 for managing deployment of an application. A logical application structure containing application characteristics is established in step 202. The application characteristics for the application may be obtained in a number of different manners. For example, the application characteristics may be provided by a user, extracted directly from the application or obtained by providing the user with a series of possible requirements with subsequent series of requirements being adaptively presented according to previous user selections. After the application characteristics have been obtained, the logical application structure is generated therefrom. The logical application structure represents the application as multiple deployable elements that may be related. Each of the deployable elements has a type and has application characteristics for deployment. The process of establishing the logical application structure is described in conjunction with FIG. 3.

A logical deployment template is produced in step 204. The logical deployment template contains logical deployment characteristics and has regard for types of elements in the logical application structure. The logical deployment template describes how different types of elements that may be in the application are to be deployed according to various types of resources. The logical deployment template may be produced by obtaining the logical deployment characteristics (possibly from a user) and generating the logical deployment template therefrom. Alternatively, the logical deployment template may be selected from the logical deployment templates in a data store based on the types of the elements in the logical application structure. The selected logical deployment template may be the template in the data store that best contains logical deployment characteristics for every type of element in the logical application structure. The process of establishing the logical deployment template is described in conjunction with FIG. 4.

A network topology template is produced in step 206. The network topology template contains network characteristics and has regard for types of elements in the logical application structure. The network topology template describes the network connections for different types of modules in the application. The network topology template may be produced by obtaining the network characteristics (possibly from a user) and generating the network topology template therefrom. Alternatively, the network topology template may be selected from network topology templates in a data store based on the types of the elements in the logical application structure. The selected network topology template may be the template in the data store that contains network characteristics for every type of element in the logical application structure. The process of establishing the logical deployment template is described in conjunction with FIG. 5.

The logical application structure is compared in step 208 with the logical deployment template and the network topology template to determine the resources to be used for the deployment and their general configuration. Groups of servers may be clustered together for deployment with each server in the cluster being provided with the same configuration. A server template is developed in step 210 for the configuration of server clusters. A deployment plan providing a high level logical view of the deployment solution is developed in step 212 based on the results of the comparison in step 208. The deployment plan includes the server template developed in step 210.

Based on the deployment plan, a request to reserve resources identified in the deployment plan is created in step 214. This request contains all of the resources that are to be used for the deployment of the application.

The request is reviewed in step 216 against a level of service that is to be provided for the application. This is to check if the level of service will be met based on the resources identified in the request or if there are so many resources requested that the level of service will be exceeded. The request is also reviewed in step 218 against other similar requests and against the available resources to determine whether the request can be satisfied. If the request can be satisfied then a correlation between the deployment plan to the available resources is made in step 220 to specify the exact resources and their configuration that are to be used in the deployment.

Figure 3:
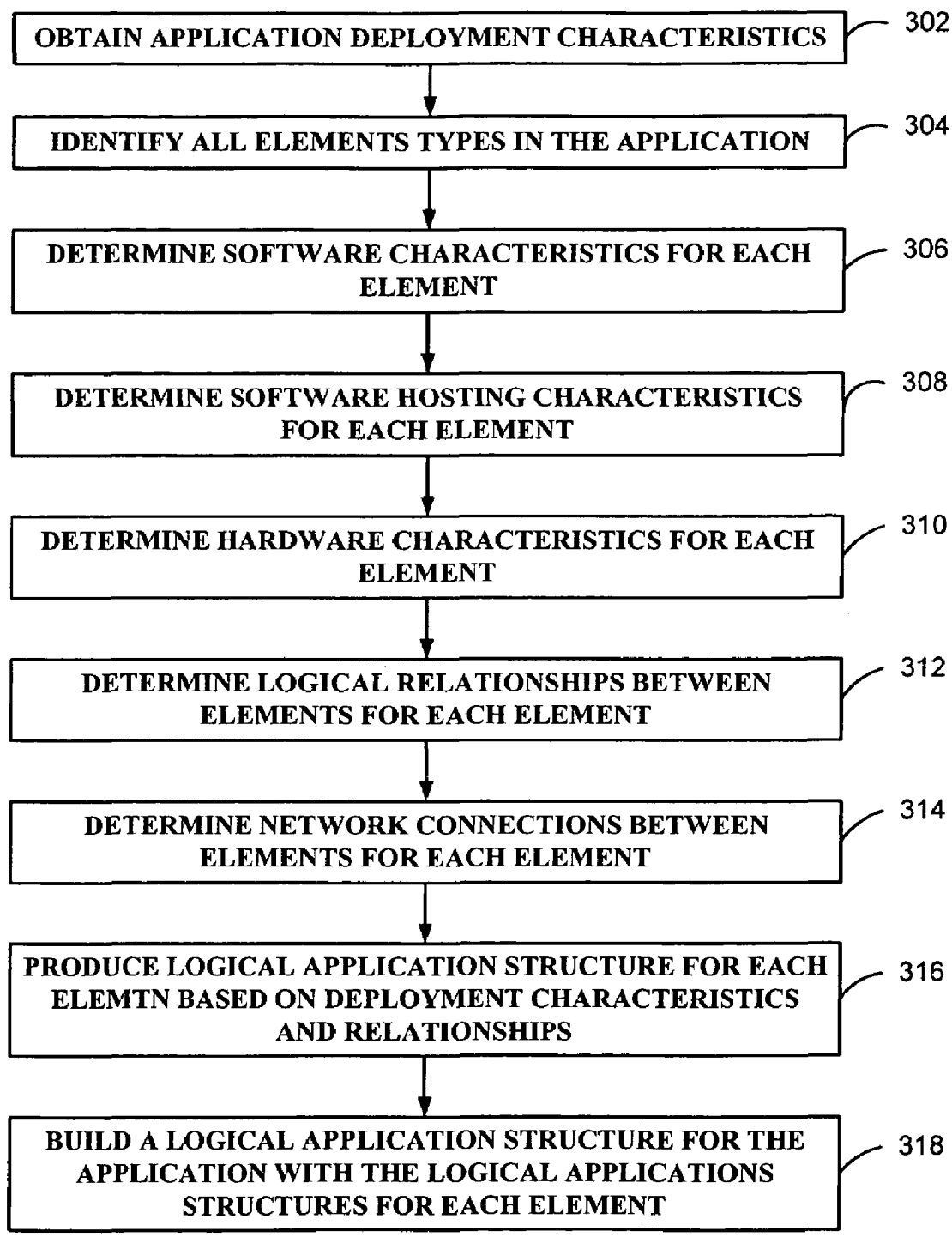
FIG. 3 illustrates a method of establishing a logical structure for an application as used in the method of FIG. 2.

After the resource reservation request has been reviewed, a workflow structure is expanded to implement the deployment plan in step 222. This workflow is based on a workflow structure and is completed based on characteristics in the deployment plan and the correlation made in step 220. This expanded workflow is then executed in step 224 to deploy the application. FIG. 3 illustrates a method 300 of establishing the logical structure for an application as in step 202 of the method 200 in FIG. 2. The logical application structure contains desired characteristics of the deployment that are specific to the application and do not depend on the environment in which the application is deployed. The logical application structure is a structured representation of the deployable elements, their resource requirements and their interdependencies and may include a reference to the actual element in the application that is being represented. The method 300 may be implemented in the application structure mechanism 108 shown in FIG. 1.

Application characteristics are obtained in step 302. The application characteristics represent the resources and their configurations that are either needed or can be used for the deployment of the application. The application characteristics may depend on a type of deployment for the application (e.g. for testing, for production, for limited release, etc.) or may indicate the minimum characteristics for an environment in order for the application to be successfully deployed. The actual environment in which the application will eventually be deployed is not reflected in the application characteristics.

The application characteristics may be obtained in a number of different ways. For example, a user could provide a list of such application characteristics. This list may include an indication of a configuration in the resource system (taking into consideration both hardware and software resources and their deployed configuration) for each type of element in the application. The application characteristics may also be obtained from the user by presenting the user with an adaptable series of resources that may be selected. A first series of possible resources may be presented for selection by the user based on a basic level of service and also on resources that are present (and possibly have available capacity) in the resource system model 102. Subsequent series of possible resources presented to the user may be adapted based on previous resource selection(s). In this manner, the user may provide input for the application characteristics but is guided through the process of establishing the characteristics.

Alternatively, the application characteristics may be automatically obtained from the application itself. During development, cues may be embedded in the application that provide an indication of the resources used by each element of the application. These cues may be provided by a developer of the application or by a development environment in which the application is created. In order to obtain the application characteristics, the application may be searched to extract these cues therefrom. These extracted cues then form the application characteristics.

The application characteristics may be provided in a form that mirrors the elements of the application. Each element in the application may have particular characteristics relevant to deployment thereof. These characteristics may include software and hardware resources and their configuration used for execution as well as dependencies and relationships between the elements. The application characteristics may present the characteristics for each element as distinct and separate. If the application characteristics are not provided for each element but rather for the application as a whole then this categorization may be provided through subsequent processing.

All of the elements in the application and their associated type are identified in step 304. The element type may be associated with the functionality provided by the element (e.g. a database, a web server, etc.) The elements are identified to ensure that application characteristics for each element in the application are provided in the logical application structure resulting from the method 300.

Software characteristics identified in the application characteristics are determined in step 306. The software characteristics may include all software resources and their configurations that are either needed or can be used for the application deployment. A further breakdown may occur in step 306 with the software characteristics for each of the identified element types being determined.

Software hosting characteristics are determined in step 308. The software hosting characteristics identify any resources and configuration for hosting software identified in the software characteristics. The software hosting characteristics are translated into hardware resources and configurations for the hardware resources that are to be used for hosting the software. These hardware resources and configurations are grouped together with other hardware characteristics in step 310.

Hardware characteristics identified in the application characteristics are determined in step 310. The hardware characteristics may include the hardware resources and their configurations that are either needed or can be used for the application deployment. A further breakdown may occur in step 310 with the hardware characteristics for each of the identified element types being determined.

Any logical relationships between elements are determined in step 312 based on the application characteristics. The logical relationships may include any dependencies that exist between elements in the application. These logical relationships may be used when developing the deployment plan 138 to identify network configurations.

Any network connections between elements are determined in step 314 based on communication dependencies of the elements. The network connections may include any network connections that are established between elements in the application and between the elements and systems external to the application.

The logical application structure for each element is produced in step 316 based on the application characteristics and relationships (both logical relationships and network connections) between elements. The logical application structure contains an identification of application characteristics for every type of element in the application including hardware and software resources to be used. The relationships between the elements are also represented in the logical application structure in a manner that may also be reflected in the hardware and software characteristics.

The logical application structure may be produced as a hierarchical structure that enables embedding of other logical applications structures. For example, a logical application structure may be created for each type of element in the application. A high-level logical application structure may be generated for the entire application by incorporating the logical application structures for each type of element in the application into the high-level logical application structure.

Figure 4:
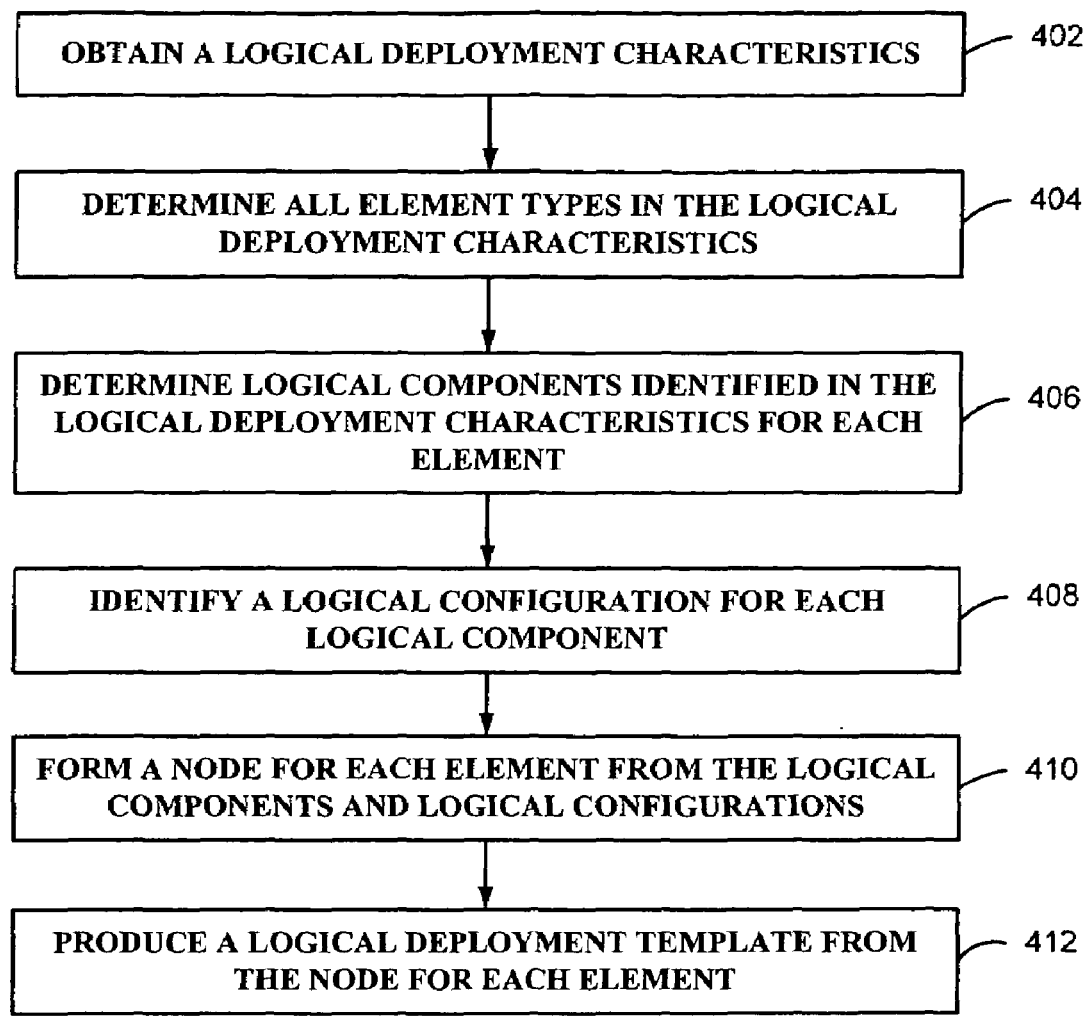
FIG. 4 illustrates a method of establishing a logical deployment template as used in the method of FIG. 2.

A logical application structure for the application as a whole is built in step 318 using the logical application structure for each type of element in the application. Alternatively, step 316 and 318 may be performed together with a single logical application structure being produced for the application FIG. 4 illustrates a method 400 of establishing a logical deployment template as in step 204 of the method 200 in FIG. 2 for application deployment. The method 400 produces a logical deployment template that describes from a logical view how different types of elements that could compose an application are to be deployed according to various types of resources and other characteristics. This logical view of desirable deployment characteristics is not dependent upon the characteristics of a particular application that may be deployed but rather can be used for any application that is to be deployed in a particular environment to which the logical deployment template pertains. The method 400 may be implemented in the logical deployment template mechanism 116.

Logical deployment characteristics are obtained in step 402. The logical deployment characteristics represent configuration characteristics of a desired application deployment. The logical deployment characteristics may be obtained directly from a user in the form of a list of characteristics.

Alternatively, the logical deployment characteristics may be obtained by presenting the user with an adaptable series of characteristics that may be selected. A first series of possible characteristics may be presented for selection by the user based on basic operating characteristics for an environment. Subsequent series of possible resources presented to the user may be adapted based on previous resource selection(s). In this manner, the user may provide input for the logical deployment characteristics but is guided through the process of establishing the characteristics.

The elements that are identified in the logical deployment characteristics are determined in step 404. Since a node will be developed for each type of element identified in the logical deployment characteristics, all of the element types indicated in the logical deployment characteristic set are extracted for later verification.

Logical components identified in the logical deployment characteristics are determined in step 406. The logical components may include such components as logical servers and external systems. External systems may identify clients or services that the application to be deployed is accessed from or accesses but the external systems do not call for deployment.

Logical configurations identified in the logical deployment characteristics are determined in step 408. The logical configurations may include such configurations as logical clusters of servers and logical load balancers. For a logical cluster of servers, the logical configurations may identify various characteristics about the cluster including a range for the number of servers in the cluster as well as a generic configuration for each server in the cluster.

A node for each type of element identified in the logical deployment characteristics is formed in step 410. This node contains the logical deployment for an element of the type represented by the node including an indication of the logical components and logical configurations.

A logical deployment template is produced from the nodes in step 412. The node for each type of element is combined to produce the logical deployment template. If the nodes are structured in a tree structure in the logical deployment template then relationships and dependencies between elements can also be represented in the logical deployment template.

The logical deployment template is not based on an actual application or on the actual resources in the resource system model 102. Rather, the logical deployment template is a generic representation of a desirable configuration (including resources to be used) for the deployment of different types of elements (such as may be found in an application). The logical deployment template describes the logical structure of an application deployment, how elements of the application will be deployed on servers and clusters of servers, etc.

Figure 5:
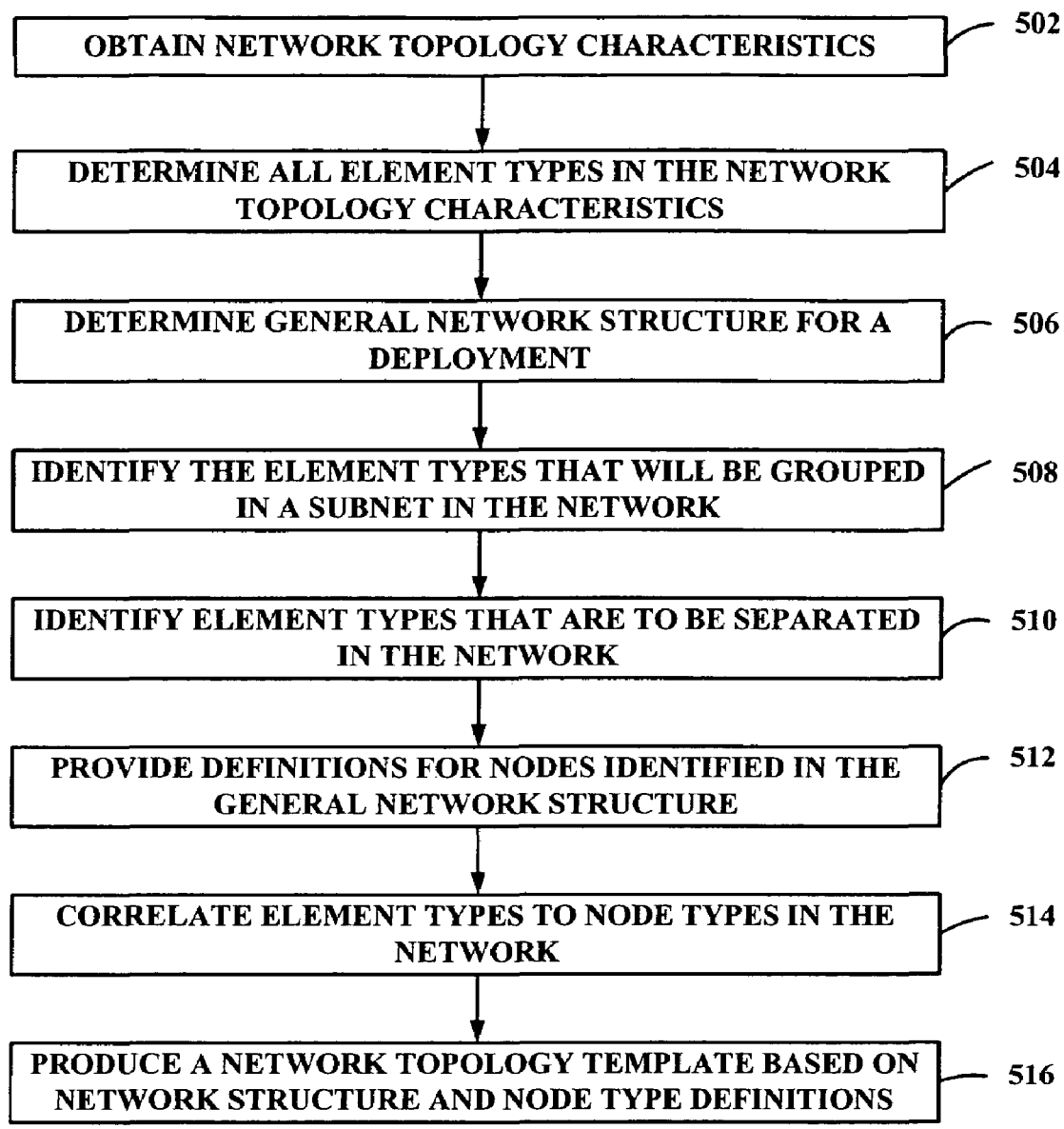
FIG. 5 illustrates a method of establishing a network topology template as used in the method of FIG. 2.

FIG. 5 illustrates a method 500 of describing a network topology for application deployment as in step 206 of the method 200 in FIG. 2. The method 500 produces a network topology template that describes the network connections for different types of elements that could be in an application. The view of the network connections in the network topology template is not dependent on the characteristics of a particular application that is to be deployed in a particular environment to which the network topology template pertains. The method 500 may be implemented in the network topology template mechanism 118.

Network topology characteristics are obtained in step 502. The network topology characteristics characterize various guidelines from the resource system pertaining to the manner in which various hardware resources may be part of a network topology and other characteristics (e.g. policies and service level agreements) that are to be considered in the deployment in the areas of security, redundancy and capacity. The network topology characteristics may be obtained directly from a user in the form of a list of characteristics.

Alternatively, the network topology characteristics may be obtained by presenting the user with an adaptable series of characteristics that may be selected. A first series of possible characteristics may be presented for selection by the user based on basic networking characteristics for an environment. Subsequent series of possible resources presented to the user may be adapted based on previous resource selection(s). In this manner, the user may provide input for the network topology characteristics but is guided through the process of establishing the characteristics.

The element types in the network topology characteristics are determined in step 504.

The general network structure for a deployment is determined in step 506 based on the network topology characteristics. The general network structure can define a list of virtual local area networks (VLANs), each of which may contain one or more sub-networks. The general network structure may identify the manner in which the VLANs are connected.

The element types that are to be grouped together on the same sub-network are identified in step 508 and the element types that are to be separated on different sub-networks are identified in step 510.

Each of the sub-networks includes interfaces that are network-addressable nodes. Definitions for each of these nodes are determined in step 512. There may be multiple types of nodes in each sub-network, including external nodes, server nodes, load-balancer nodes, etc. An external node defines points of interaction with systems outside of the resource system. A server node is a computing platform that can be used in the deployment of elements. The server nodes include an indication of the type of elements that they can host. Correlation between the element types determined in step 504 and the server node is performed in step 514 to provide an outline for each element type of the arrangement in which it will be placed during deployment.

A network topology template is produced in step 516 based on the general network structure and definitions for each of the nodes including the correlation between the element types and the nodes.

The network topology template is not based on an actual application or actual resources in the resource system model 102. Rather the network topology template is a generic representation of a desirable networking layout that may be used for the deployment of many different applications within the resource system. That is, the network topology template presents how an application deployment (using any application) will be configured from a networking perspective. The network topology template describes such a networking layout, how traffic may be separate (e.g. using VLANs and subnets), relationships between networking resources and how actual physical resources may be arranged in a network topology.

Embodiments of the present invention may be implemented in any conventional computer programming language. For example, embodiments may be implemented in a procedural programming language (e.g. "C") or an object oriented language (e.g. "C++"). Further embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Some embodiments of the invention may be implemented as a combination of both software (e.g. a computer program product) and hardware (termed mechanisms). Still other embodiments of the invention may be implemented as entirely hardware, or entirely software (e.g. a computer program product).

It is apparent to one skilled in the art that numerous modifications and departures from the specific embodiments described herein may be made without departing from the spirit and scope of the invention.

The invention claimed is:

1. A method of managing deployment of an application using available hardware and software resources from a resource system, the method comprising: establishing a resource dependency characterization of the application to enable deployment, wherein the step of establishing a resource dependency characterization comprises obtaining resource dependency characteristics for the application and forming the resource dependency characterization as a hierarchical logical application structure based on the resource dependency characteristics, wherein the application is composed of a plurality of individually deployable elements, each of the plurality of elements having a type and wherein the logical application structure comprises: a resource dependency characterization for each type of element in the application comprising:

interdependency characteristics indicating respective interdependencies of a respective element with respect to other of the deployable elements;

software dependency characteristics indicating software resources used to enable deployment for an element of the type;

software hosting characteristics indicating hardware and communication resources that are required for hosting the software resources;

hardware dependency characteristics indicating hardware resources used to enable deployment for an element of the type; and relational characteristics indicating a relationship between an element of the type and other types of elements;

wherein the resource dependency characteristics for the application are obtained from embedded cues within the application that provide an indication of the hardware and software resources used by each element of the application; establishing a logical characterization of a desired deployment, wherein the step of establishing a logical characterization comprises obtaining logical characteristics for the desired deployment and forming the logical characterization in the form of a hierarchical logical deployment template based on the logical characteristics, wherein the logical deployment template comprises:

a logical characterization for each type of element in the desired deployment comprising:
  logical component characteristics indicating logical components to be used in the desired deployment; and
  logical configuration characteristics indicating logical configurations for the logical components to be used in the desired deployment;
establishing a network characterization for the desired deployment, wherein the step of establishing a network characterization comprises obtaining network characteristics for the desired deployment and forming the network characterization in the form of a network topology template based on the network characteristics, wherein the network topology template comprises:
  a network structure providing a general network topology having sub-networks with nodes therein and indicating types of elements that can be grouped together in sub- networks and types of elements to be placed in separate sub-networks; and
  a definition for each type of node indicating types of elements supported by the node; developing a deployment plan containing an outline of resources and configurations used for deployment based on (1) the resource dependency characterization, (2) the logical characterization, (3) the network characterization, and (4) a resource system model comprising (i) data on available system resources, including both hardware resources and software resources, that are currently un-deployed and available for use in execution of the application and (ii) relationships between the available system resources, wherein the step of developing a deployment plan comprises-comparing the resource dependency characterization with the logical characterization the network characterization and the resource system model, and producing the deployment plan indicating (a) hardware and software resources and hardware and software configurations that satisfy the resource dependency characterization of the application under constraints of the logical characteristics, (b) the network characteristics, and (c) the data on the available system resources;
processing the deployment plan for correlation with the available resources, wherein the step of processing the deployment plan comprises assembling a request of all the hardware and software resources and the hardware and software configurations identified in the deployment plan, evaluating the request against criteria and constraints of operating conditions for the resource system as well as a level of service to be provided by the application, evaluating the request against other requests for other applications and the available hardware and software resources to balance all requests for this application and the other applications, the hardware and software resources, and associating the request with the available hardware and software resources to form the processed deployment plan, wherein the data on the available system resources is updated in the resource system model to reflect a change in status of the hardware and software resources identified in the associated request, and wherein the processing of the development plan occurs after the development plan has been developed by the developing step; and
implementing the processed deployment plan, wherein the step of implementing the processed deployment plan comprises expanding a workflow framework to include the hardware and software resources and the hardware and software configurations identified in the associated request, and executing the expanded workflow to deploy the application, wherein the implementing of the processed development plan occurs after the processed development plan has been processed by the processing step.

2. The method of claim 1, wherein the relationships between the available resources includes connections between a plurality of servers.

3. The method of claim 1, wherein the hierarchical logical template is a generic representation of the desired deployment that is not based on the application.

4. The method of claim 3, wherein the network topology template is a generic representation of a desired network layout used for the desired deployment that is not based on the application.

5. The method of claim 1, wherein the logical characteristics for the desired deployment are specified by a user to provide a logical view of desired characteristics of a logical configuration of the desired deployment.

6. The method of claim 5, wherein the network characteristics for the desired deployment are specified by the user to depict communication connections between resources.

7. A data processing system, having a memory hardware device, for
  managing deployment of an application using available hardware and software resources from a resource system, the data processing system comprising:
    an application structure mechanism for establishing a logical application structure containing resource dependency characterization of the application to enable deployment, wherein the application is composed of a plurality of individually deployable elements, each of the plurality of elements having a type and wherein the data structure comprises:
    a resource dependency characterization for each type of element in the application comprising:
      interdependency characteristics indicating respective interdependencies of a respective element with respect to other of the deployable elements;
      software dependency characteristics indicating software resources used to enable deployment for an element of the type;
      software hosting characteristics indicating hardware and communication resources that are required for hosting the software resources;
      hardware dependency characteristics indicating hardware resources used to enable deployment for an element of the type; and
      relational characteristics indicating a relationship between an element of the type and other types of elements;
    wherein the resource dependency characteristics for the application are obtained from embedded cues within the application that provide an indication of the hardware and software resources used by each element of the application;

a logical deployment template for establishing a logical deployment template containing logical characterization of a desired deployment, wherein the data structure further comprises: a logical characterization for each type of element in the desired deployment comprising:

logical component characteristics indicating logical components to be used in the desired deployment; and logical configuration characteristics indicating logical configurations for the logical components to be used in the desired deployment;

a network topology template for establishing a network topology template containing network characterization for the desired deployment, wherein the data structure comprises:

a network structure providing a general network topology having sub-networks with nodes therein and indicating types of elements that can be grouped together in sub- networks and types of elements to be placed in separate sub-networks; and a definition for each type of node indicating types of elements supported by the node;

a deployment mechanism for developing a deployment plan containing an outline of resources and configurations used for deployment based on (1) the resource dependency characterization, (2) the logical characterization, (3) the network characterization, and (4) a resource system model comprising (i) data on available system resources, including both hardware resources and software resources, that are currently undeployed and available for use in execution of the application and (ii) relationships between the available system resources, wherein the deployment mechanism comprises a deployment plan production mechanism for comparing the resource dependency characterization of with the logical characterization the network characterization and the resource system model, and producing the deployment plan indicating (a) hardware and software resources and hardware and software configurations that satisfy the resource dependency characterization of the application under constraints of the logical characteristics, (b) the network characteristics and (c) the data on the available system resources;

a request processing mechanism for processing the deployment plan, developed by the deployment mechanism, for correlation with the available resources, wherein the request processing mechanism comprises a request mechanism for assembling a request of all the hardware and software resources and the hardware and software configurations identified in the deployment plan, an evaluation mechanism for evaluating the request against criteria and constraints of operating conditions for the resource system as well as a level of service to be provided by the application, a balancing mechanism for evaluating the request against other requests for other applications and the available hardware and software resources to balance all resources for this application and the other applications; a correlation mechanism for associating the request with the available hardware and software resources to form the processed deployment plan, wherein the data on the available system resources is updated in the resource system model to reflect a change in status of the hardware and software resources identified in the associated request; and an implementation mechanism for implementing the processed deployment plan processed by the request processing mechanism, wherein the implementation mechanism comprises a workflow mechanism for expanding a workflow framework to include the hardware and software resources and the hardware and software configurations identified in the associated request, and a workflow execution mechanism for executing the expanded workflow to deploy the application.

8. The data processing system of claim 7, wherein the relationships between the available resources includes connections between a plurality of servers.

9. The data processing system of claim 7, wherein the hierarchical logical template is a generic representation of the desired deployment that is not based on the application.

10. The data processing system of claim 9, wherein the network topology template is a generic representation of a desired network layout used for the desired deployment that is not based on the application.

11. A computer readable medium having stored thereon computer-executable instructions for managing deployment of an application using available hardware and software resources from a resource system, the computer-executable instructions comprising:

establishing a resource dependency characterization of the application to enable deployment, wherein the step of establishing a resource dependency characterization comprises obtaining resource dependency characteristics for the application, and forming the resource dependency characterization as a hierarchical logical application structure based on the resource dependency characteristics, wherein the application is composed of a plurality of individually deployable elements, each of the plurality of elements having a type and wherein the logical application structure comprises: a resource dependency characterization for each type of element in the application comprising:

interdependency characteristics indicating respective interdependencies of a respective element with respect to other of the deployable elements; software dependency characteristics indicating software resources used to enable deployment for an element of the type;

software hosting characteristics indicating hardware and communication resources for hosting the software resources;

hardware dependency characteristics indicating hardware resources used to enable deployment for an element of the type; and relational characteristics indicating a relationship between an element of the type and other types of elements;

wherein the resource dependency characteristics for the application are obtained from embedded cues within the application that provide an indication of the hardware and software resources used by each element of the application; establishing a logical characterization of a desired deployment, wherein the step of establishing a logical characterization comprises obtaining logical characteristics for the desired deployment, and forming the logical characterization in the form of a hierarchical logical deployment template based on the logical characteristics, wherein the logical deployment template comprises:

a logical characterization for each type of element in the desired deployment comprising:

logical component characteristics indicating logical components to be used in the desired deployment; and logical configuration characteristics indicating logical configurations for the logical components to be used in the desired deployment;

establishing a network characterization for the desired deployment, wherein the step of establishing a network characterization comprises obtaining network characteristics for the desired deployment, and forming the network characterization in the form of a network topology template based on the network characteristics, wherein the network topology template comprises:

a network structure providing a general network topology having sub-networks with nodes therein and indicating types of elements that can be grouped together in sub-networks and types of elements to be placed in separate sub-networks; and a definition for each type of node indicating types of elements supported by the node;

developing a deployment plan containing an outline of resources and configurations used for deployment based on (1) the resource dependency characterization, (2) the logical characterization, (3) the network characterization, and (4) a resource system model comprising (i) data on available system resources, including both hardware resources and software resources, that are currently un- deployed and available for use in execution of the application and (ii) relationships between the available system resources, wherein the step of developing a deployment plan comprises comparing the resource dependency characterization of with the logical characterization the network characterization and the resource system model, and producing the deployment plan indicating (a) hardware and software resources and hardware and software configurations that satisfy the resource dependency characterization of the application under constraints of the logical characteristics (b) the network characteristics, and (c) the data on the available system resources;

processing the deployment plan for correlation with the available resources, wherein the step of processing the deployment plan comprises assembling a request of all the hardware and software resources and the hardware and software configurations identified in the deployment plan, evaluating the request against criteria and constraints of operating conditions for the resource system as well as a level of service to be provided by the application, evaluating the request against other requests for other applications and the available hardware and software resources to balance all requests for this application and the other applications, and associating the request with the available hardware and software resources to form the processed deployment plan, wherein the data on the available system resources is updated in the resource system model to reflect a change in status of the hardware and software resources identified in the associated request, and wherein the processing of the development plan occurs after the development plan has been developed by the developing step; and implementing the processed deployment plan, wherein the step of implementing the processed deployment plan comprises expanding a workflow framework to include the hardware and software resources and the hardware and software configurations identified in the associated request, and executing the expanded workflow to deploy the application, wherein the implementing of the processed development plan occurs after the processed development plan has been processed by the processing step.

12. The computer readable medium of claim 11, wherein the relationships between the available resources includes connections between a plurality of servers.

13. The computer readable medium of claim 11, wherein the hierarchical logical template is a generic representation of the desired deployment that is not based on the application.

14. The computer readable medium of claim 13, wherein the network topology template is a generic representation of a desired network layout used for the desired deployment that is not based on the application.

* * * * *